(12) United States Patent
Fernie et al.

(10) Patent No.: US 9,011,620 B2
(45) Date of Patent: Apr. 21, 2015

(54) DOUBLE TRANSITION JOINT FOR THE JOINING OF CERAMICS TO METALS

(75) Inventors: John Andrew Fernie, Reading (GB); Martyn David Roberts, Abergavenny (GB); Yong Wang, Houston, TX (US); Narayanan Rajesh Kavilveedu, Katy, TX (US); David J. Brown, Ittre (BE)

(73) Assignee: Technip Process Technology, Inc., Houston, TX (US)

( * ) Notice: Subject to any disclaimer, the term of this patent is extended or adjusted under 35 U.S.C. 154(b) by 1052 days.

(21) Appl. No.: 12/558,387

(22) Filed: Sep. 11, 2009

(65) Prior Publication Data
US 2011/0065973 A1 Mar. 17, 2011

(51) Int. Cl.
*C03B 29/00* (2006.01)
*B28B 5/00* (2006.01)
(Continued)

(52) U.S. Cl.
CPC ............. *C04B 37/003* (2013.01); *B23K 20/021* (2013.01); *B23K 35/004* (2013.01); *B23K 35/007* (2013.01); *B23K 2203/18* (2013.01); *C04B 35/117* (2013.01); *C04B 35/565* (2013.01); *C04B 37/023* (2013.01); *C04B 2235/3217* (2013.01); *C04B 2235/3826* (2013.01); *C04B 2235/80* (2013.01); *C04B 2235/9607* (2013.01); *C04B 2237/062* (2013.01); *C04B 2237/064* (2013.01); *C04B 2237/068* (2013.01); *C04B 2237/08* (2013.01); *C04B 2237/083* (2013.01); *C04B 2237/12* (2013.01); *C04B 2237/121* (2013.01); *C04B 2237/122* (2013.01); *C04B 2237/123* (2013.01); *C04B 2237/124* (2013.01); *C04B 2237/341* (2013.01); *C04B 2237/343* (2013.01); *C04B 2237/348* (2013.01); *C04B 2237/36* (2013.01); *C04B 2237/365* (2013.01); *C04B 2237/368* (2013.01); *C04B 2237/40* (2013.01);
(Continued)

(58) Field of Classification Search
USPC ................ 156/89.11; 264/241; 428/469, 610; 427/446
See application file for complete search history.

(56) References Cited

U.S. PATENT DOCUMENTS 2,018,619 A  10/1935  Winkler et al.
2,667,432 A  1/1954  Nolte et al.
(Continued)

FOREIGN PATENT DOCUMENTS

EP  1 018 563 A1  7/2000
JP  61-53174  3/1986
(Continued)

OTHER PUBLICATIONS

Fernie, John A., et al. "Joining of engineering ceramics," International Materials Reviews, 2009 Vo. 54, No. 5, pp. 283-331.
(Continued)

*Primary Examiner* — Alex Efta
(74) *Attorney, Agent, or Firm* — Locke Lord LLP; Alan B. Clement; Peter J. Fallon (57) ABSTRACT

The invention is directed to effective means for joining materials having dissimilar coefficients of thermal expansion, such as advanced ceramics with metallic compounds. Moreover, the present invention relates to furnace tubes and methods of fabricating a joint between two different materials, which is compositionally graded to provide a substantially graded coefficient of thermal expansion between the joint materials.

17 Claims, 2 Drawing Sheets

(51) Int. Cl.

| | | |
|---|---|---|
| B32B 9/00 | (2006.01) | |
| B22D 25/00 | (2006.01) | |
| B05D 1/08 | (2006.01) | |
| C04B 37/00 | (2006.01) | |
| B23K 20/02 | (2006.01) | |
| B23K 35/00 | (2006.01) | |
| C04B 35/117 | (2006.01) | |
| C04B 35/565 | (2006.01) | |
| C04B 37/02 | (2006.01) | |
| C10G 9/20 | (2006.01) | |

(52) U.S. Cl.
CPC .... C04B 2237/402 (2013.01); C04B 2237/403 (2013.01); C04B 2237/405 (2013.01); C04B 2237/407 (2013.01); C04B 2237/58 (2013.01); C04B 2237/72 (2013.01); C04B 2237/74 (2013.01); C04B 2237/80 (2013.01); *C10G 9/20* (2013.01); C10G 2400/20 (2013.01)

(56) References Cited

U.S. PATENT DOCUMENTS

| | | | |
|---|---|---|---|
| 2,987,382 | A | 6/1961 | Endter et al. |
| 3,403,722 | A | 10/1968 | Woebcke |
| 3,620,799 | A | 11/1971 | Hoelscher et al. |
| 3,671,198 | A | 6/1972 | Wallace |
| 3,746,374 | A | 7/1973 | Sedgwick et al. |
| 3,772,766 | A | 11/1973 | Ebendt |
| 3,862,488 | A | 1/1975 | Pessell et al. |
| 3,910,347 | A | 10/1975 | Woebcke |
| 4,109,031 | A | 8/1978 | Marscher |
| 4,167,351 | A | 9/1979 | Bindin |
| 4,167,357 | A | 9/1979 | Assad |
| 4,346,049 | A | 8/1982 | Coppola et al. |
| 4,349,203 | A | 9/1982 | Schülke |
| 4,356,151 | A | 10/1982 | Woebcke et al. |
| 4,499,055 | A | 2/1985 | DiNicolantonio et al. |
| 4,588,607 | A * | 5/1986 | Matarese et al. ............. 427/452 |
| 4,602,731 | A | 7/1986 | Dockus |
| 4,610,934 | A | 9/1986 | Boecker et al. |
| 4,642,864 | A | 2/1987 | Metcalfe et al. |
| 4,702,503 | A | 10/1987 | von Koch |
| 4,719,075 | A | 1/1988 | Tsuno et al. |
| 4,723,862 | A | 2/1988 | Ito et al. |
| 4,871,108 | A | 10/1989 | Boecker et al. |
| 4,902,358 | A | 2/1990 | Napier et al. |
| 5,013,612 | A | 5/1991 | Hunt et al. |
| 5,042,847 | A | 8/1991 | Lasecki et al. |
| 5,073,085 | A | 12/1991 | Ito et al. |
| 5,120,374 | A | 6/1992 | Mizuhara |
| 5,161,728 | A | 11/1992 | Li |
| 5,163,416 | A | 11/1992 | Schultz et al. |
| 5,236,787 | A * | 8/1993 | Grassi ........................ 428/552 |
| 5,248,079 | A | 9/1993 | Li |
| 5,254,318 | A | 10/1993 | Williams et al. |
| 5,271,827 | A | 12/1993 | Woebcke |
| 5,364,010 | A | 11/1994 | Mizuhara |
| 5,407,119 | A | 4/1995 | Churchill et al. |
| 5,427,655 | A | 6/1995 | Woebcke et al. |
| 5,683,825 | A * | 11/1997 | Bruce et al. ................. 428/698 |
| 5,807,616 | A | 9/1998 | Trotter, Jr. |
| 6,409,847 | B2 | 6/2002 | Kleemann |
| 7,318,547 | B2 | 1/2008 | Gasse |
| 7,393,559 | B2 | 7/2008 | Groza et al. |
| 7,482,502 | B2 | 1/2009 | Brown et al. |
| 2003/0064234 | A1* | 4/2003 | Payne et al. ................. 428/469 |
| 2004/0147794 | A1 | 7/2004 | Brown et al. |
| 2008/0113218 | A1* | 5/2008 | Schlichting et al. .......... 428/701 |
| 2008/0131723 | A1 | 6/2008 | Tucker et al. |

FOREIGN PATENT DOCUMENTS

| | | |
|---|---|---|
| JP | 61-143576 | 7/1986 |
| JP | 05-286776 | 11/1993 |
| JP | 07-237980 | 9/1996 |
| JP | 2004-51634 | 2/2004 |
| WO | WO 94/15896 | 7/1994 |

OTHER PUBLICATIONS

International Search Report dated Oct. 22, 2010, received in corresponding international patent application No. PCT/US2010/047691.

Written Opinion of the International Searching Authority dated Oct. 22, 2010, received in corresponding international patent application No. PCT/US2010/047691.

PCT Notification Concerning Transmittal of International Preliminary Report on Patentability Report on (Chapter I of the Patent Cooperation Treaty) dated Mar. 22, 2012 corresponding International Patent Application No. PCT/US2010/047691.

PCT International Preliminary Report on Patentability dated Mar. 13, 2012 corresponding International Patent Application No. PCT/US2010/047691; PCT International Search Report and PCT Written Opinion of the International Searching Authority (PCT Rule 43bis.1) dated Oct. 22, 2010, corresponding International Patent Application No. PCT/US2010/047691.

Canadian Office Action dated May 7, 2013 corresponding to Canadian Patent Application No. 2,773,538.

Chinese Office Action dated Jul. 3, 2013 corresponding to Chinese Application No. 201080042541.0.

Eurasian Office Action dated Sep. 12, 2013 corresponding to Eurasia Application No. 201290114/31.

Singapore Office Action dated May 7, 2013 corresponding to Singapore Application No. 201201642-4.

Canadian Office Action dated Jan. 10, 2014 corresponding to Canadian Patent Application No. 2,773,538.

Chinese Office Action dated Mar. 7, 2014 corresponding to Chinese Application No. 201080042541.0 (in Chinese and its English translation).

Eurasian Office Action dated Nov. 12, 2013 corresponding to Eurasia Application No. 201290114/31.

Japanese Office Action dated May 7, 2014 corresponding to Japanese Application No. 2012-528842.

Extended European Search Report, Supplementary European Search Report and the European Search Opinion dated Jul. 17, 2014 corresponding to European Application No. Ep 10815935.1.

Shujie Li et al., "Joining of SiC ceramic to Ni-based superalloy with functionally gradient material fillers and a tungsten intermediate layer," Journal of Materials Science, 38:19, pp. 4065-4070 (Jan. 1, 2003).

C.S. Lee et al., "Novel Joining of Dissimilar Ceramics in the $Si_3N_4$—$Al_2O_3$ System Using Polytypoid Functional Gradients," Acta Materialia, 49:18, pp. 3775-3780 (Oct. 1, 2001).

J.Q. Li et al., "Fabrication and thermal properties of a YSZ-NiCr joint with an interlayer of YSZ-NiCr functionally graded material," Journal of the European Ceramic Society, 23:11, pp. 1847-1853 (Oct. 1, 2003).

R.W. Messler, Jr., "A Model for Designing Functionally Gradient Material Joints," Welding Journal, 74:5, pp. 160-s-167-s (May 1, 1995).

Albright, Lyle F., in Comments on "Kinetic Modeling of Coke Formation during Steam Cracking," Industrial & Engineering Chemistry Research, 41 (24) pp. 6210-6212, 2002.

Fernie, John, in "Techniques for bonding ceramics," Welding Institute Bulletin, Sep./Oct. 1990, pp. 92-93.

Fernie, John A., in "Joining Ceramic Materials," provided in "Ceramic Joining," Edited by I.E. Reimanis, C.H. Henager, and A.P. Tomsia, published by the American Ceramic Society, Westerville, OH, vol. 77, pp. 3-14 (1997).

Fernie, J. et al., in "Progress in joining of advanced materials," Welding and Metal Fabrications, 59(4) (1991) pp. 179-184.

Lee, C.S. et al., in "Novel joining of dissimilar ceramics in the $Si_3N_4$—$Al_2O_3$ system using polytypoid functional gradients," Acta materialia, 49 (2001) pp. 3775-3780.

(56) References Cited

OTHER PUBLICATIONS

Lee, C.S. et al., in "Effect of functionally graded material (FGM) layers on the residual stress of polytypoidally joined $Si_3N_4$—$Al_2O_3$," Materials Science and Engineering A, 434 (2006) pp. 160-165.

Pietrzak, K. et al., in "Interlayer of $Al_2O_3$—Cr functionally graded material for reduction of thermal stresses in alumina-heat resisting steel joints," Journal of the European Ceramic Society, 27 (2007) pp. 1281-1286.

Reyniers, M.-F.S.G. et al., in Reply to Comments on "Kinetic Modeling of Coke Formation during Steam Cracking," Industrial & Engineering Chemistry Research, 41 (24) pp. 6213-6214, 2002.

Ruys, A.J. et al., in "Functionally graded electrical/thermal ceramic systems," Journal of the European Ceramic Society, 21 (2001) pp. 2025-2029.

Wauters, S. et al., in "Kinetic modeling of coke formation during steam cracking," Industrial & Engineering Chemistry Research, 41 (10) pp. 2379-2391, 2002.

Chinese Office Action dated Aug. 21, 2014 corresponding to Chinese Application No. 201080042541.0 (in Chinese and its English translation).

Eurasian Office Action dated Sep. 4, 2014 corresponding to Eurasia Application No. 201290114/31 (in Eurasia and its English translation).

* cited by examiner

DOUBLE TRANSITION JOINT FOR THE JOINING OF CERAMICS TO METALS

FIELD OF THE PRESENT INVENTION

The present invention relates generally to joining materials having dissimilar coefficients of thermal expansion and, more particularly, to furnace tubes and methods of fabricating a joint, between two different materials in an apparatus, which is functionally or compositionally graded and provides a substantially graded coefficient of thermal expansion (CTE).

BACKGROUND OF THE PRESENT INVENTION

Oil and gas refineries frequently use systems of pipes and tubes (hereinafter "tubes") in processing fluids. In many applications, tubing is used not only as a conduit for transporting fluids to be processed, but also as an integral component of the chemical plant processing equipment, for example, cracking furnace tubes.

Cracking furnaces of the prior art generally comprise a refractory lined firebox containing a multiplicity of highly alloyed (metallic) reactor furnace tubes through the interior of which flows the hydrocarbon feedstock to be cracked, together with a suitable amount of dilution steam. The sensible heat and the heat of cracking are supplied primarily by radiant heat from burners located on the floor and/or walls of the firebox. This heat transfers through the alloy reaction lines (reactor furnace tubes) into hydrocarbon feedstock that flows there within to provide the necessary energy for cracking the hydrocarbons.

Moreover, cracking furnaces, as constructed today, provide for millisecond residence time at a maximum bulk fluid temperature of about 1625° F., and are, with respect to their radiant heated reactor furnace tubes, constructed of metallic materials. The fireboxes themselves, which may be lined with refractory materials, are capable of delivering a greater heat load than the metallic materials of the reactor furnace tubes can withstand. This maximum service temperature of the metallic materials, of which the reactor furnace tubes are constructed, limits the performance of the aforementioned reactor furnace tubes with regard to their capacity (which should be as high as possible), and their residence time (which should be as short as possible) and, hence, selectivity (to achieve the highest possible yield of valuable olefinic product species like ethylene and propylene, for example).

Given the relatively high temperatures to which the reactor furnace tubes are exposed in a thermal cracking process, metallic materials have been the preferred materials for construction of such tubes. As reactor designers have strived for the higher capacity and higher selectivity in the process, which would result from the use of materials with higher maximum service temperature limits, they have steadily improved the properties of the metallic alloys from which the reactor furnace tubes are manufactured.

Conventional reactor furnace tubes are constructed of nickel-containing alloys, the majority of which are prepared from compositions comprising chromium, nickel and iron in the range of 18 to 38 weight percent chromium, 18 to 48 weight percent nickel, the balance iron, i.e., steels, and alloying additives. These alloys are used in industrial processes that operate at elevated temperatures generally above 1100° F. and up to 2000° F., or more. In general, the development of the nickel-containing alloys for reactor furnace tubes, in order to increase the maximum service temperature of the aforesaid reactor furnace tubes, has been accomplished by the careful control of composition and microstructure to produce, for example, improved quality austenitic nickel-chromium steels. See, for example, Kleeman, U.S. Pat. No. 6,409,847 (the contents of which are incorporated herein by reference). The best nickel-containing austenitic steels and alloys, however, still have maximum service temperatures of only around 2100° F.

At high cracking temperatures, however, the nickel in conventional reactor furnace tubes acts as a catalyst for coke formation inside the tube—a particular form of coke that is termed "catalytic coke." Coke also forms on the walls of the metal tubes as the result of the pyrolysis itself, i.e., the action of time and temperature (particularly the very hot wall temperature) on the coke precursor material produced in the reactant mass. This type of coke, having both a different formation mechanism and a different structure from catalytic coke, is known as "pyrolytic coke." The coke formed by pyrolysis overlays on top of the catalytic coke in the reactor furnace tube. The deposition of pyrolytic coke, being a function of time, temperature and coke precursor material, increases in amount along the tube length, peaking at the output end of the reaction tube where time, temperature and precursors are at increased levels. For recent examples of a general discussion of coke formation in the cracking field, see, for example, the following: "Kinetic Modeling of Coke Formation during Steam Cracking", S. Wauters and G. B. Marin, Industrial & Engineering Chemistry Research, 41 (10), 2379-91; Comments on "Kinetic Modeling of Coke Formation during Steam Cracking," Lyle F. Albright, Industrial & Engineering Chemistry Research, 41 (24), 6210-12; and Reply to Comments on "Kinetic Modeling of Coke Formation during Steam Cracking," Marie-Francoise S. G. Reyniers, Sandra Wauters, and Guy B. Marin, Industrial & Engineering Chemistry Research, 41 (24), 6213-14.

Coke formation is deleterious to the process for a number of reasons. The deposition of coke on the insides of the reactor furnace tubes constricts the flow path for the hydrocarbons, causing an increased system pressure drop and reduced throughput. The higher average hydrocarbon partial pressure reduces the selectivity of the process; and in extreme cases, the coke can cause maldistribution of flow (between parallel reactor furnace tubes) and, ultimately, a decrease in the furnace capacity. Additionally, the coke lay-down on the inside of the furnace tubes increases the resistance to heat transfer between the outside of the reactor tube wall and the bulk fluid flowing within the reactor tube. Consequently, the outside flue gas temperature, the firing rate and the outside tube wall temperature have to be increased in order to maintain the same temperature and/or conversion of the hydrocarbon fluid flowing within the tube. Eventually the outside temperature of the wall of the reactor tube can reach the maximum service limit for the material from which the tube is manufactured, under which circumstances the furnace needs to be shut down and the coke removed by passing a mixture of steam and air through the tubes in order to convert the coke (basically carbon) to a mixture of carbon oxides. This process is known as "decoking." Decoking consumes valuable resources and, in the case of conventional nickel-containing metallic alloy reactor furnace tubes, reduces the life of the tubes. Tube life is reduced by a variety of mechanisms including, but not limited to, abrasion, thermal fatigue, and damage to the internal oxide protective layer.

Attempts to reduce coking by varying the materials used for reactor furnace tubes are found in the prior art. For example, the prior art describes the use of silicon ceramics for reactor furnace tube construction. For example, Winkler et al., U.S. Pat. No. 2,018,619, describes an apparatus for the pyrogenic conversion of hydrocarbons that uses reaction tubes made from silicon powder; Endter et al., U.S. Pat. No. 2,987,382, describes a furnace for carrying out gas reactions in ceramic tubes; Coppola et al., U.S. Pat. No. 4,346,049, discloses silicon carbide powder compacts for forming furnace tubes; and Williams et al., U.S. Pat. No. 5,254,318 describes lined tubes for high pressure reformer reactors. European Patent Application EP 1 018 563 A1 discloses a heating furnace tube comprising a rare earth oxide particle dispersion strengthened (ODS) iron alloy containing 17-26 wt. % of Cr and 2-6 wt. % of Al and a method for using and manufacturing such a heating tube in locations where the coking and carburization problems occur during the process.

More recent innovations to furnace tube compositions include more temperature resistant, non-nickel containing materials, such as, ceramics and/or oxide dispersion-strengthened ("ODS") alloys for use in cracking hydrocarbon feedstock at temperatures of 1300° F. or higher, see for example U.S. patent application No. 2004/0147794, the entire contents of which are incorporated herein by reference.

The various tubes used in chemical plant processing equipment have different material requirements. For example, reactor furnace tubes located within the radiant section of the furnace are required to tolerate temperatures above the cracking temperature of the feedstock. It is very important only to have the feed at a temperature above cracking for a specific amount of time in order to prevent overcracking or non-selective cracking. Furnace tubes, however, are connected to other tubes, such as, transfer and cross-over tubes for transporting the hydrocarbon gases. Because cross-over tubes and transfer tubes are not exposed to as much heat as the furnace tubes are exposed to, their composition can be quite different than that of the furnace tubes. The use of mixtures of various materials, such as, ceramics, metallic and the like, in order to provide furnace tubes that can withstand higher temperatures, increase capacity and higher selectivity, has invariably lead to the need for joining together ceramics and metallic alloys in various processing equipment components.

Moreover, the joining of metals/alloys and ceramic materials is problematic. Joining can be considered as the creation of a controlled interface between the two components or materials to be joined. It is important to control the interface for two main reasons: first, to ensure that appropriate or advantageous chemical reactions occur (to ensure wetting and bonding in a brazing operation, for example, or to provide sufficient diffusion in a diffusion bond); and, second, to negate, if possible, the differences in coefficient of thermal expansion (CTE).

For example, the joining of silicon carbide (SiC) and iron chromium nickel alloys fails because the materials react in a deleterious manner (at temperatures above about 2000° F.) to form relatively low melting point Ni-silicides. Such reactions could take place during bonding procedures such as brazing or diffusion bonding, or during service. Additionally, these materials have a very different co-efficient of thermal expansion (CTE). If the two materials were brought directly together and joined (by brazing or diffusion bonding, for example), there is a high likelihood of failure (if the bond area is any more than a few square millimeters).

There are various ways known to overcome the effects of CTE mismatch. These include the use of a single interlayer, double interlayers and flexible interlayers. These interlayers being bonded between the two primary components. Fully graded or functionally graded materials or interlayers have also been proposed. Fernie et al. Welding and Metal Fabrication, 5 (1991) 179-194.

Although combining two different materials, for example, advanced (i.e., technical) ceramics and metal alloys to produce functionally graded materials (FGM) is known in the art, see for example, Pietrzak et al. Journal of the European Ceramic Society, 27 (2007), pgs. 1281-1286 and Ruys et al., Journal of the European Ceramic Society, 21 (2001), pgs. 2025-2029, the methods disclosed in the prior art have met with some utility, but suffer from drawbacks. Similarly, the production of functionally graded materials based on two ceramics has been demonstrated, C. S. Lee, X. F. Zhang and G. Thomas: 'Novel joining of dissimilar ceramics in the $Si_3N_4$—$Al_2O_3$ system using polytypoid functional gradients', *Acta Mater.*, 2001, 49, 3775-3780.

Thus, there remains a need within the industry for joining different materials having dissimilar coefficients of thermal expansion, such as advanced ceramics with metallic materials, to provide improved tubes, for use in, e.g., chemical plant processing equipment.

SUMMARY OF THE PRESENT INVENTION

The present invention provides a method of fabricating a joint between two materials in an apparatus comprising transitioning from a first material A to a first metal material B wherein first material A and first metal material B are incompatible (for any chemical or thermo-mechanical reasons), at the temperature of operation of said apparatus, (or during joining processes of said materials), said method comprising:

i) a first transitioning of said first material A to a second material C wherein second material C is compatible at the temperature of operation of said apparatus with both first material A and first metal material B, and wherein said first transitioning between first material A and second material C is functionally graded to provide a gradation having a substantially graded composition and/or coefficient of thermal expansion between the first material A and second material C; and ii) a second transitioning between the second material C and the first metal material B wherein said second transitioning between the second material C and first metal material B is functionally graded to provide a gradation having a substantially graded composition and/or coefficient of thermal expansion between the second material C and the first metal material B, with the proviso that said joint contains at least two gradations.

The present invention is also directed to a furnace element for use with a furnace for thermally cracking a hydrocarbon feedstock into olefinic hydrocarbon products, the furnace element comprises a joint having first material A, a first metal material B, wherein the first material A and the first metal material B are incompatible (for any chemical or thermo-mechanical reasons), at the temperature of operation of said furnace, and a second material C, wherein said second material C is compatible at the temperature of operation of said furnace with both first material A and first metal material B, and wherein said second material C is functionally graded between first material A and first metal material B to provide a gradation having a substantially graded composition and/or coefficient of thermal expansion between first material A and first metal material B, with the proviso that said joint contains at least two gradations.

A process for cracking a hydrocarbon feedstock into olefinic hydrocarbon products, said process comprising cracking said hydrocarbons in a furnace at a temperature of at least about 1300° F. in a pyrolysis cracking furnace comprising a plurality of reactor furnace tubes, wherein at least one said reactor furnace tube comprises a joint having a first material A, a first metal material B, wherein the first material A and the first metal material B are incompatible (for any chemical or thermo-mechanical reasons), at said temperature, and a second material C, wherein second material C is compatible at said temperature with both first material A and first metal material B, and wherein second material C is functionally graded between first material A and first metal material B to provide a gradation having a substantially graded composition and/or coefficient of thermal expansion between the first material A and first metal material B, with the proviso that said joint contains at least two gradations.

The novel and inventive double transition joint of the present invention enables joining of different materials having dissimilar coefficients of thermal expansion, such as, for example, silicon carbide based ceramics and iron-chromium-nickel based alloys, by providing at least two functionally graded transitions (i.e., gradations) of material between the silicon carbide and the metal alloy.

The novel joint/design is characterized by a continuous compositional change. i.e., "gradation" (from A to C to B) and a graded coefficient of thermal expansion. Thus, there is the prevention of deleterious chemical reactions between the different materials and the inherent mismatch in CTE is also overcome. The inventive joint can be strategically positioned within a hydrocarbon cracking furnace to provide a furnace tube having superior heat resistance and strength where it is most effectively needed (or outside the furnace, if desired).

DETAILED DESCRIPTION OF THE PRESENT INVENTION

The following detailed description of present invention is presented to illustrate the present invention and is not to be construed to limit the scope of the appended claims in any manner whatsoever.

The design of the present invention provides a novel double transitional "joint" between different materials having dissimilar coefficients of thermal expansion, for example, silicon carbide based ceramics and iron-chromium-nickel based alloys, which are chemically or thermomechanically incompatible at temperatures required in a chemical processing apparatus, such as those necessary for hydrocarbon cracking, or during joining processes.

According to an embodiment of the invention, first material A of the present invention can be any of those materials that are used, or could be used, in the production high-performance reactor furnace tubes. Examples of materials useful in the manufacture of high-performance reactor furnace tubes (i.e., for the process of cracking of hydrocarbons by pyrolysis at significantly higher reactor furnace tube temperatures than previously practiced) include ceramics, advanced ceramics, ceramic based composites, intermetallics and/or oxide dispersion-strengthened materials (i.e., "ODS") and the like.

Ceramic materials are generally defined as inorganic non-metallic materials that are formed by the action of heat. However, more relevant to the practice of the present invention are technical, engineering or advanced ceramic materials. These are generally based on relatively simple combinations of B, C, N, O, Al, Si, Zr and Ti. There are three general categories of technical/engineering/advanced ceramic materials (hereinafter "advanced ceramic material"), which include: oxides, such as, alumina ($Al_2O_3$), and zirconia ($ZrO_2$); non-oxides, such as, carbides, e.g., silicon carbide, SiC, boron carbide $B_4C$, and tungsten carbide (WC) based, borides, e.g., $TiB_2$ and $ZrB_2$, nitrides, e.g., boron nitride (BN), silicon nitride ($Si_3N_4$), and SiAlONs), and silicides e.g. $Ti_3Si_5$; and composites, such as any combination of oxides and non-oxides (termed ceramic matrix composites; CMCs). These materials can be manufactured/formed to shape in a number of ways including, but not limited to, sintering (S), hot pressing (HP) and reaction bonding (RB). For example, silicon carbide (SC) can be sintered (SSC), pressureless sintered (PSSC), hot pressed (HPSC) and reaction bonded (RBSC). They may also be sprayed, or formed via liquid or gaseous reaction.

First material A may include a wide variety of any advanced ceramic material, including, but not exclusively SiC-based ceramic materials silicon nitride ($Si_3N_4$) based materials, alumina based, magnesium diboride ($MgB_2$), steatite (magnesium silicates), zirconium dioxide (zirconia) based, and any composites/combinations of these materials. According to one specific embodiment of the invention, first material A is silicon carbide, in any of its forms, PSSC, SSC or HPSC for example.

The ceramic materials useful in the present invention are any of the known advanced ceramic materials that can be shaped into a tubular construction and include, but are not limited to, silicon carbide (SiC) material in any of its forms. Examples of SiC tubes include, but are not limited to, tubes sold under the trade name Hexoloy® SA by Saint-Gobain Advanced Ceramics (formerly Carborundum) and tubes sold under the trade name Halsic-S by W. Haldenwanger Technische Keramik GmbH & Co. KG.

According to an embodiment of the invention, first metal material B of the present invention can be any metal material known in the art for the manufacturing of tubing used in processing of cracked hydrocarbons, or for transporting feedstock to a reactor. The materials used to prepare process tubing encompasses conventional metallic materials, e.g., metal 25Cr35Ni. However, improved reactor designs providing higher capacity and higher selectivity in the process have been the result of improved metallic alloys from which the reactor furnace tubes are manufactured.

According to an embodiment of the invention, first metal material B of the present invention is a metal alloy. Examples of metal alloys include, but are not limited to, alloys of aluminum, alloys of copper, alloys of magnesium, alloys of zinc, alloys of iron, alloys of nickel, alloys of titanium, and the like (such as, 25Cr35Ni, austenitic stainless steel and Incoloy®). According to an embodiment of the invention, first metal material B is at least one metal material. However, according to one specific embodiment of the invention first metal material B is an iron-chromium-nickel based alloy. According to an embodiment of the invention, first metal material B is at least one material selected from the group consisting of alloys of aluminum, alloys of copper, alloys of magnesium, alloys of zinc, alloys of iron, alloys of nickel, alloys of titanium and alloys of cobalt.

According to an embodiment of the invention, first and second transitions further comprise an additional metal material.

An associated problem of joining different materials together, such as ceramics and metal alloys, is that different materials usually have different coefficients of thermal expansion (CTE). The CTE is a measure that represents the dimensional response of a substance to changes in temperature, i.e., how much a material expands when heated. In general, but not always, metals expand more than ceramics for a given (positive) change in temperature.

Thus, if first material A and first metal material B were joined together directly, they would expand and contract at different rates (e.g. the CTE of SiC is ~$3.5\times10^{-6}$ $C.^{-1}$ and FeCrNi (iron-chromium-nickel based alloy) is ~$14\times10^{-6}$ $C.^{-1}$, respectively). The resultant stresses built up at the interface, either during bonding or thermal cycling in service, would almost certainly cause failure—or at best a very complicated and potentially dangerous stress system.

In an effort to join different materials, the use of functionally graded materials (FGM) has been studied in the prior art. FGM are characterized by a variation in composition and structure gradually over volume, resulting in corresponding changes in the properties of the material. FGM can be designed for specific functions and applications. As known in the art, various approaches can be used to fabricate FGM, the processes include bulk particulate processing, pre-form processing, layer processing, extrusion, spraying and melt processing. In the fabrication of FGM, there is a "transitioning" of the materials, which provides a gradual change or passage from one material or composition to another. According to a specific embodiment of the present invention, the gradual change from one material to another (i.e., "gradation," or "graded") is utilized to effect a substantially graded composition and/or coefficient of thermal expansion between two materials. Within the context of the present invention, FGM(s) are used to prepare a "joint" or connection between two different materials or compositions having dissimilar coefficients of thermal expansion.

Second material C of the present invention provides the necessary material to prepare a functionally graded material, or gradation, between the first material A and the first metal material B. Second material C of the present invention is prepared from materials or compounds useful as transitional materials for the preparation of FGM and includes materials and compounds, such as, but not limited to, alumina, zirconia and spinel (magnesium aluminate, $MgAl_2O_4$). According to one specific embodiment of the invention, second material C is alumina.

According an embodiment of the present invention, second material C is a material or composition possessing a CTE that is intermediate to material A and first metal material B. As an example, if material A is SiC, which has a CTE of approximately $3.5\times10^{-6}$ $C.^{-1}$ and first metal material B is a steel having a CTE of approximately $14\times10^{-6}$ $C.^{-1}$, then second material C would be a material or composition that has a CTE intermediate to the CTE of SiC and steel, i.e., somewhere between $3.5\times10^{-6}$ $C.^{-1}$ and $14\times10^{-6}$ $C.^{-1}$.

The present invention involves a method of fabricating a joint between two different materials, in this case one is a ceramic and the other a metal. There are several methods known in the art for producing ceramic-metal joints. These may be generally categorized as either mechanical or chemical. There are advantages and disadvantages to both, depending on the final requirements of the components. Frequently the biggest issue is that of mismatch in coefficient of thermal expansion (CTE).

Conventional means to overcoming the problem of CTE mismatch between various materials has included the use of inter-layers or volumes joined between the two materials, such that the CTE of the inter-layer is intermediate to those of the ceramic and metal. The simplest inter-layer is a single piece of material. In some instances more than one inter-layer can be used. Another option is to use a compliant inter-layer (e.g., spring or foam like). Another option to prevent a thermal expansion mismatch includes a layer of suitably graded material. The depth of a solid graded layer is usually a significant fraction (or even multiples) of its diameter dependant on the extent of the CTE mismatch. If not, the stress build up will either cause the bond to fail on cooling from the bonding temperature, or will contribute to premature failure.

The present invention contemplates the use of a more complex design based on the use of at least two gradations (e.g., two separate inter-layers) having a substantially graded composition and/or coefficient of thermal expansion, i.e., a "double transition." The two gradations provide a double transition of graded materials between the different end piece materials (i.e., first material A and first metal material B), which are to be joined together (the use of more than two gradations is contemplated herein, e.g., transition between first metal material B and third material D and/or transition between first material A and fourth material E). The inventive joint design provides excellent thermal shock resistance, chemical durability, high strength and toughness. In service, the hot end of the joined materials will be exposed to temperature greater than necessary for hydrocarbon cracking, and the cooler end material which make up, for example, a cross-over or transfer tube, will experience temperatures that are less than necessary for hydrocarbon cracking. Thus, the invention is capable of providing furnace tubes that can withstand higher temperatures, increase capacity and higher selectivity, while being joined to tubes prepared from conventional metal material and overcomes the problems of reactivity between the first material A and first metal material B, and the issues associated with mismatch in CTE.

Figure 1:
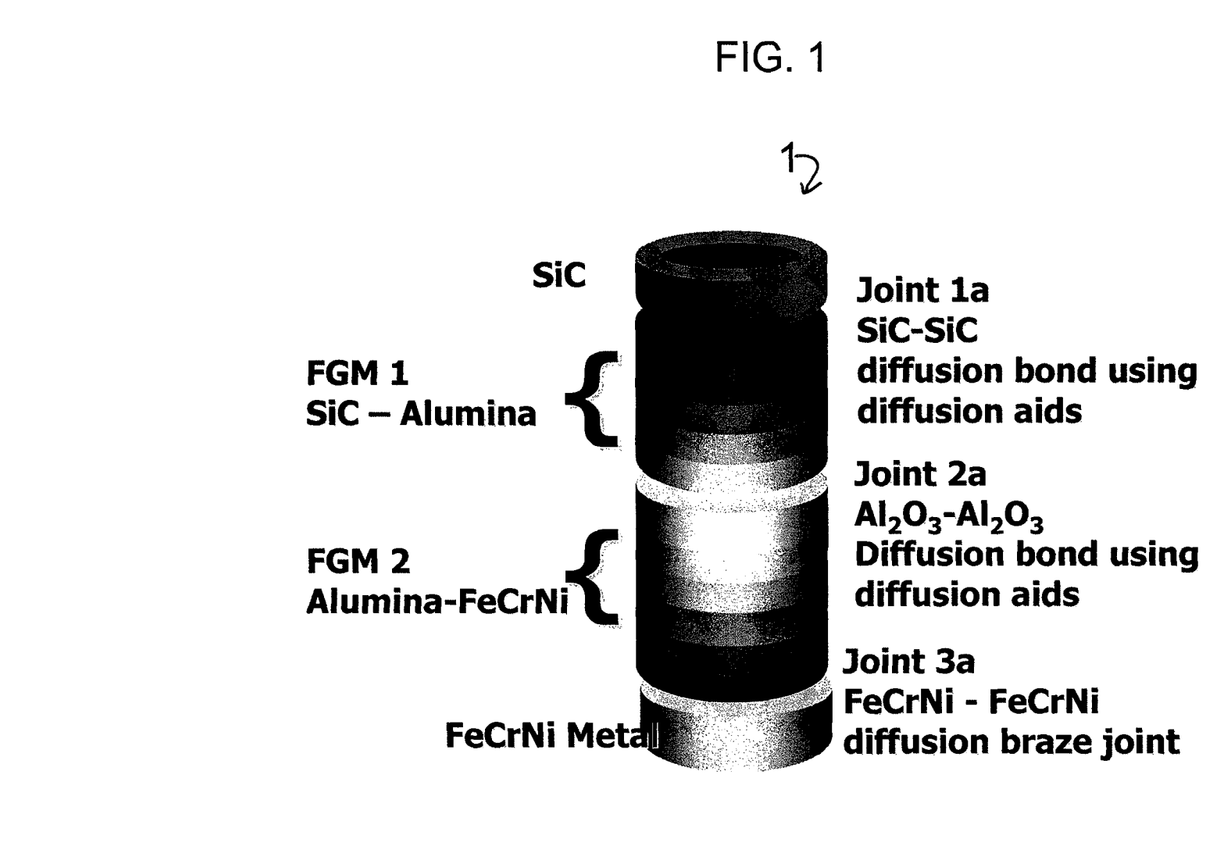
FIG. 1 depicts a side planar view of an embodiment of a double transitional joint between two end piece materials, i.e., silicon carbide and iron-chromium-nickel based alloy, which are graded by a second material, alumina $Al_2O_3$.

FIG. 1 depicts a specific embodiment of a double transitional joint 1 between two different end piece materials, one end piece material is silicon carbide (SiC) and the other end piece material is iron-chromium-nickel (Fe—Cr—Ni) based alloy. The use of silicon carbide is exemplary of the materials that can be used in the construction of high-performance reactor furnace tubes, and according to a preferred embodiment of the invention silicon carbide is the first material A of the invention. Iron chromium nickel metal alloys are a commonly used materials in the construction of reactor furnace tubes to support current services demands, and according to a specific embodiment of the invention, first metal material B is an iron chromium nickel based alloy.

FIG. 1 presents examples of component materials necessary to overcome the difficulties arising from the mismatch in the coefficient of thermal expansion between silicon carbide and iron chromium nickel alloys. The direct joining of silicon carbide and iron chromium nickel alloys cannot be accomplished (for the required service temperatures) because the two materials react to form relatively low melting point Ni-silicides. They also have very different CTEs which prohibit direct joining of large pieces. As such, present methods for joining these materials will not support the temperatures necessary for cracking hydrocarbon feedstock.

The current inventors have solved this problem by preparing a joint that provides a "double transition" from the silicon carbide of the high performance furnace tubes to the conventional FeCrNi based metal alloy of the transfer and/or cross-over tubes. As presented in FIG. 1, graded compositions of the invention are prepared utilizing functionally graded piece 1 ("FMG 1") and functionally graded piece 2 ("FMG 2") to provide two gradations or transitional segments between the dissimilar materials. The gradations or transitional segments are made from a series of materials, which continuously or semi-continuously grade from one another to form the graded inter-layers or volumes of the inventive joint. The gradations, once bonded together, provide a transition between the silicon carbide and iron chromium nickel base alloy. Within the current embodiment of the double transition joint, there are three areas of bonding represented in FIG. 1 as joint 1a, joint 2a and joint 3a, respectively. According to an embodiment of the invention, joint 1a and joint 2a are produced using techniques based on uniaxial diffusion bonding, with or without the use of chemical agents (i.e., diffusion aid). As know in the art, diffusion bonding, or more particularly, solid-state diffusion bonding is a process by which two nominally flat interfaces can be joined at an elevated temperature (about 50%-90% of the absolute melting point of the parent material) using an applied pressure for a time ranging from a few minutes to a few hours. Use of diffusion bond aids, as know in the art, can be utilized in the process. Hot isostatic pressing (HIPing) is also contemplated here.

Joint 3a can be prepared by the technique of brazing, or diffusion brazing as known to those of skill in the art. According to another option, joint 3a is welded by techniques that are also known to those skilled in the art.

Referring again to FIG. 1, functionally graded material 1 (FMG 1), i.e., the gradation, is prepared by grading silicon carbide (first material A) completely through to second material C, i.e., $Al_2O_3$. The grading of the materials is prepared either continuously or semi continuously by means of ceramic processing routes as known in the art. These processing routes may include, for example, the use of powder mixing and sintering, liquid or gas phase infiltration, extrusion and sintering and spraying. According to one specific embodiment of the invention, Alumina (i.e., any of several forms of aluminum oxide, $Al_2O_3$, aka aluminum oxide) is the second material C, which is introduced as an intermediary material between the silicon carbide and Ni-containing alloys. The use of alumina has two beneficial effects: first, it forms an impermeable barrier between the silicon carbide and the iron chromium nickel metal alloy and secondly it possesses an intermediate coefficient of thermal expansion. Silicon carbide has a CTE of approximately $3.5 \times 10^{-6} \, C^{-1}$, $Al_2O_3$ has a CTE of approximately $8.0 \times 10^{-6} \, C^{-1}$; and "FeCrNi" has a CTE of approximately $14 \times 10^{-6} \, C^{-1}$, respectively.

If continuous grading is performed, the materials may be graded continuously through appropriate mixing of loose powders and sintering. For example, 100 percent silicon carbide provides the starting point and it is gradually decreased though adjustments in amount of SiC and $Al_2O_3$ mixed together, until the end surface, i.e., joint 2a, is 100 percent alumina. If semi-continuous grading is performed, the materials are graded semi-continuously by the use of discrete layers stacked on top of each other and bonded together. Semi-continuous grading provides layers, for example, that start with a first discrete layer containing 100 percent silicon carbide and 0 percent alumina, a second discrete layer containing 90 percent silicon carbide and 10 percent alumina, a third discrete layer containing 80 percent silicon carbide and 20 percent alumina, a fourth discrete layer containing 70 percent silicon carbide and 30 percent alumina, and so on until there is a discrete layer of 100 alumina and 0 percent silicon carbide. Likewise, it is understood that other variations in the percentages of the materials of the grading process are possible.

Next in the semi-continuous grading process, a second transitional piece, i.e., FGM 2 or second gradation (see FIG. 1), is prepared by providing discrete layers that continue from the discrete layer of 100 alumina and 0 percent Fe—Cr—Ni and proceed in order of a layers containing, for example, 90 percent alumina and 10 percent Fe—Cr—Ni, a further discrete layer containing 80 percent alumina and 20 percent Fe—Cr—Ni, and so on until there is a discrete layer of 100 Fe—Cr—Ni and 0 percent alumina, which can be brazed to the iron chromium nickel metal alloy. Likewise, it is understood that other variations in the percentages of the materials of the grading process are possible.

As in the semi-continuous grading process, a second or double transition layer, i.e., gradation, is started at joint 2a in the continuous grading process, whereby 100 percent alumina starts the grading process and continues to decrease in amount until there is only the iron chromium nickel based alloy material, thus providing the unique double transition of SiC to $Al_2O_3$ and from $Al_2O_3$ to Fe—Cr—Ni based metal alloy.

Significantly, by either of the grading processes presented herein there are no deleterious reactions between the SiC/$Al_2O_3$ and the $Al_2O_3$/Fe—Cr—Ni-containing alloys.

Figure 2:
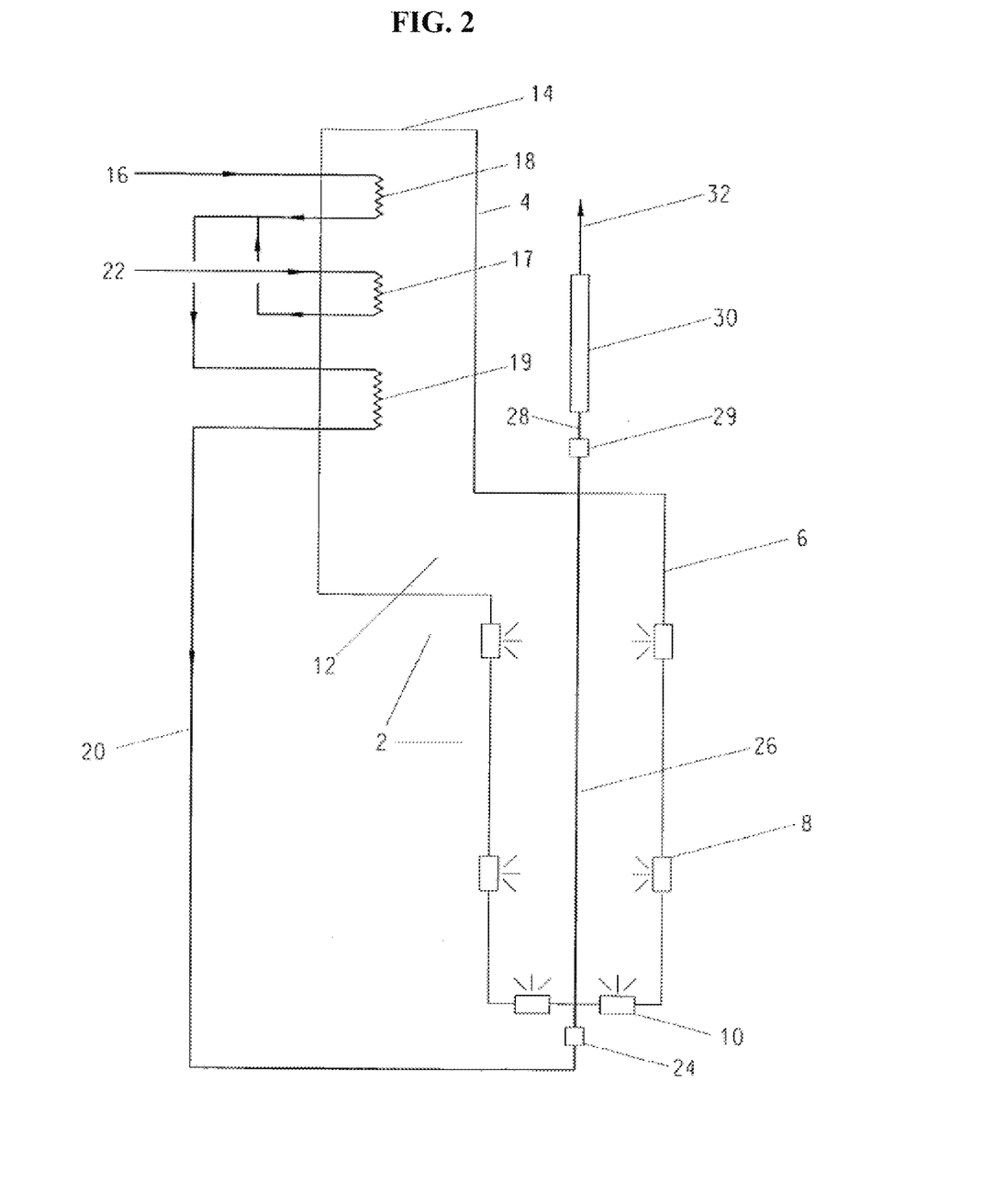
FIG. 2 depicts in schematic form an embodiment of a cracking furnace tube useful in the practice of the present invention.

The FGM 2, as presented in FIG. 1, can be prepared by any of the techniques known to those skilled in the art, for example, conventional powder processing and firing, by melt infiltration techniques, extrusion and thermal spraying for example. A preferred embodiment of the invention is the use of FeCrNi alloy. Other materials could be used; Ni aluminides for example. The aluminides have a higher temperature capability than the Fe—Cr—Ni based alloys, and can be melt infiltrated, FIG. 2 depicts in schematic form a cracking furnace 2 useful in the practice of the present invention. The furnace 2 comprises a preheat convection section 4 and a radiant section 6. The radiant section 6 is provided with wall burners 8 and floor burners 10, which are supplied with fuel via fuel lines (not shown). The furnaces of the present invention may comprise only wall burners, only floor burners or combinations thereof and are present in numbers sufficient to provide sufficient radiant heat for effecting the cracking reaction. The hot combusted gases produced by the burners exit the radiant section 6 of the furnace 2 via a transition flue 12, proceed upwardly through convection section 4 and exit the furnace via a flue 14.

In the present invention, the feedstock enters the convection section 4 of the furnace through the feed tube 16 and is preheated in a first exchanger (also known as a convection bank or convection bundle) 18 to a temperature ranging from about 200° F. to about 1000° F. Optional, dilution steam enters the convection section 4 through a separate feed tube 22 and is preheated in a second exchanger 17 to a temperature ranging from about 700° F. to about 1200° F. The preheated feed and preheated dilution steam are then mixed together and re-enter the convection section 4 into a third exchanger 19 in which the two admixed streams are heated to a temperature ranging from about 900° F. to about 1450° F. The mixture in a tube 20 (commonly referred to as the crossover tube) is then directed to the radiant section 6 of the furnace 2. Alternative arrangements include, but are not limited to, the total elimination of dilution steam, in which case the feed goes directly from exchanger 18 to tube 20 and exchangers 17 and 19, and separate feed tube 22, are not required; or the feed is not preheated, in which case the feed in tube 16 mixes directly with the preheated dilution steam from the exchanger 17 and exchanger 18 is eliminated. The crossover tube 20 to this point is comprised of conventional metallic materials, as are well known to those skilled in the art.

The feedstocks to the pyrolytic furnaces of the present invention can include any of those generally cracked in the art such as, but not limited to, propane, butane, naphtha, gas oils, or any combinations of any of the foregoing, in order to produce less saturated products such as ethylene and other higher olefins. A furnace reactor tube which has such a high resistance to coke formation would also be particularly effective for cracking heavy feeds like, for example, vacuum gas oil. Especially preferred is the pyrolytic process for selectively cracking ethane to ethylene by use of the process of the present invention by which, for example, ethane conversion can be improved from the 65% to 75% range of conventional furnaces to significantly higher levels, such as on the order of from about 85% to about 90%.

Double transition joint 24 is comprised entirely of the embodiments of the present invention. Joint 24 joins the dissimilar materials of crossover tube 20 (comprised of conventional metallic materials, as are well known to those skilled in the art) and reactor furnace tube 26. Reactor furnace tube(s) 26 of the present invention is preferably comprised of the materials disclosed herein, ceramics or oxide dispersion strengthened materials (ODS), such as those described in U.S. patent application publication No. 2004/0147794.

The use of ceramic, or high strength non-nickel containing materials, as the material of construction for the entire length of the reactor furnace tubes of the present invention enables the cracking process to be run at significantly higher temperatures than practiced conventionally. For example, whereas conventional cracking in furnace tubes was generally limited to a outside tube skin temperature of at most about 2100° F., in the practice of the present invention, with the use of a tube constructed of ceramic and/or ODS materials, the outside tube skin temperature can be at least about 2300° F. Even higher outside tube skin temperatures can be employed where the tube is constructed of ceramic materials in accordance with the present invention, i.e., such as up to about 2900° F.

Accordingly, the present invention provides a process for cracking hydrocarbon feedstocks at a reactor outlet temperature above about 1300° F., preferably above about 1450° F., and more preferably above about 1600° F., and at residence times ranging from about 0.02 s to about 0.50 s, preferably from about 0.04 s to about 0.25 s.

FIG. 2 depicts an embodiment wherein the shape of the reactor furnace tube 26 is a straight one-pass tube. However, the reactor furnace tube may be of any configuration known to those skilled in the art, such as an offset, horizontal or serpentine configuration. The length of the reactor furnace tube 26 in the depicted shape is preferably from about 20 feet to about 40 feet. However, the length of the reaction tube may vary based on its shape, diameter and the furnace capacity.

The reactor furnace tube 26 may also be provided with a means for compensating for thermal tube expansion from the heating in the radiant section of the furnace. Any of the known means for compensating for thermal expansion may be employed in the practice of the present invention, including, but not limited to the use of pigtails as seen in Wallace, U.S. Pat. No. 3,671,198 and offsets as seen in DiNicolantonio et al., U.S. Pat. No. 4,499,055. Of course, other means known to those skilled in the art including, but not limited to, springs and/or counterbalances may also be employed without departing from the present invention.

The inner diameter of the reactor furnace tube may be either constant or swaged. The outer diameter of the depicted reactor furnace tube 26 is preferably from about 1.25" to about 5.00" and most preferably from about 1.75" to about 3.00", with the inner diameter ranging from about 0.30" to about 1.00" less than the outer diameter. However, the diameters and dimensions of the reaction tube may vary in ways known to those skilled in the art. In embodiments wherein the reactor furnace tube is swaged, the inner diameter at the reactor entrance can range from about 1.00" to about 2.00" and the inner diameter at the reactor exit can range from about 1.15" to about 2.50", with a smooth transition from one to the other. However, the diameters and dimensions of the reaction tube may vary in ways known to those skilled in the art.

Depending on the desired length, the reactor furnace tube 26 can be constructed as a single tube or can comprise two or more tubes joined together. Of course, in the other embodiments of the present invention, the lengths of the tubes may vary and do not have to be equal or approximately equal.

Referring to FIG. 2, as the reactor furnace tube 26 exits the radiant furnace section 6, the material of construction is changed again to a conventional metallic material by the double transition joint 29 of the present invention. Joint 29 joins the dissimilar materials of transfer tube 28 (comprised of conventional metallic materials, as are well known to those skilled in the art) and reactor furnace tube 26. Transitional joint 29, like joint 24, is comprised of at least two transitional segments that are made from a series of materials, which continuously or semi-continuously grade from one material or composition to another. The graded segments of material, once bonded together, provide a functionally graded materials (FGM) between the conventional metallic material of transfer tube 28 (and cross-over tube 20) and the ceramic materials of reactor furnace tube 26. Transition joints 29 and 24 of the present invention are not limited in their size or shape and their use in elbow tubes, "T" tubes, reducing tubes, and the like is contemplated herein.

Again referring to FIG. 2, double transition joint 29 of the present invention connects furnace reactor tube 26 to tube 28 (commonly referred to as the transfer tube). The transfer tube 28 transfers the reaction product gases to quenching means 30, in which the aforesaid reaction product gases are rapidly cooled to a temperature below about 1000° F. to prevent further reaction. Often quenching to much lower temperatures is practiced for the purpose of accomplishing maximum energy efficiency. Quenching means 30 can comprise any of the well-known constructions known to those skilled in the art. See, for example, Woebcke et al., U.S. Pat. No. 5,427,655; Woebcke, U.S. Pat. No. 3,403,722; Woebcke, U.S. Pat. No. 3,910,347; Woebcke, U.S. Pat. No. 4,356,151; and Woebcke, U.S. Pat. No. 5,271,827. After quenching, the cracked products are sent for downstream processing via tube 32.

It should be noted that FIG. 2 is purely schematic. Details like control systems, forced draft fans, induced draft fans, utility convection bundles within the convection section (for, by way of example, preheating boiler feed water and superheating very high pressure steam) and so on, will be understood by one skilled in the art as necessary and the fact that they are not explicitly described herein does not imply that they are not included in the detailed embodiment of the invention.

Although the present invention has been described in certain preferred embodiments, all variations obvious to one skilled in the art are intended to fall within the spirit and scope of the invention, including the appended claims. All of the above-referenced patents, patent applications and publications are hereby incorporated by reference in their entirety.

What is claimed is:

1. A method of fabricating a joint between two materials in an apparatus comprising transitioning from a first material A to a first metal material B wherein first material A and first metal material B are chemically and thermomechanically incompatible at a temperature of operation of said apparatus, said method comprising:

i) a first transitioning of said first material A to a second material C, wherein second material C is compatible at the temperature of operation of said apparatus with both first material A and first metal material B, said first transitioning between first material A and second material C is graded to provide a gradation starting with 100 percent first material A and having a continuous compositional change in the amount of first material A and second material C until there is 100 percent of second material C having a coefficient of thermal expansion which substantially grades between the first material A and second material C; and ii) a second transitioning of said second material C to the first metal material B, said second transitioning between the second material C and first metal material B is graded to provide a gradation starting with 100 percent second material C and having a continuous compositional change in the amount of second material C and first metal material B until there is 100 percent of first metal material B having a coefficient of thermal expansion which substantially grades between the second material C and the first metal material B, wherein first material A is silicon carbide based, first metal material B is iron chromium nickel based, and second material C is alumina and the proviso that said joint contains at least two gradations.

2. The method of claim 1 wherein first metal material B is more than one metal material.

3. The method of claim 1 wherein said first and second transitioning is performed by at least one process selected from the group consisting of conventional powder processing and firing, bulk particulate processing, pre-form processing, layer processing, melt infiltration techniques, extrusion and thermal spraying, diffusion bonding, thermal spraying, thermal extrusion, and diffusion bond brazing.

4. The method of claim 3 wherein said first and second transitioning further comprises an additional metal material.

5. The method of claim 1 wherein the second transitioning between the second material C and the first metal material B further comprises an additional metal material.

6. The method of claim 5 wherein the additional metal material is at least one selected from the group consisting of iron-, nickel-, titanium- cobalt-, and palladium-based materials and alloys.

7. The method of claim 1 further comprising a third transitioning between said first metal material B and a third material D wherein the third transitioning between said first metal material B and said third material D is graded to provide a gradation having a substantially graded composition and/or coefficient of thermal expansion between said first metal material B and said third material D.

8. The method of claim 1 wherein second material C has a coefficient of thermal expansion that is intermediate to the coefficient of thermal expansion of first material A and first metal material B.

9. The method of claim 1, wherein said first and second transitioning steps utilize solid-state diffusion bonding.

10. The method of claim 1 wherein second material C has a coefficient of thermal expansion that is intermediate to the coefficient of thermal expansion of first material A and first metal material B.

11. A method of fabricating a joint between two materials in an apparatus comprising transitioning from a first material A to a first metal material B wherein first material A and first metal material B are chemically and thermomechanically incompatible at a temperature of operation of said apparatus, said method comprising:

i) a first transitioning of said first material A that is at least one material selected from the group consisting of SiC, $B_4C$, WC, BN, $Si_3N_4$, SiAlON, $TiB_2$, $ZrB_2$, and $MgB_2$ to a second material C that is at least one material selected from the group consisting of alumina, zirconia, and spinel, wherein second material C is compatible at the temperature of operation of said apparatus with both first material A and first metal material B, said transitioning between first material A and second material C is graded to provide a gradation starting with 100 percent first material A and having a continuous compositional change in the amount of first material A and second material C until there is 100 percent of second material C having a coefficient of thermal expansion which substantially grades between the first material A and second material C; and ii) a second transitioning of said second material C to the first metal material B that is at least one metal material selected from the group consisting of alloys of aluminum, alloys of copper, alloys of magnesium, alloys of zinc, alloys of iron, alloys of nickel, and alloys of titanium, wherein said second transitioning between the second material C and first metal material B is graded to provide a gradation starting with 100 percent second material C and having a continuous compositional change in the amount of second material C and first metal material B until there is 100 percent of first metal material B having a coefficient of thermal expansion which substantially grades between the second material C and the first metal material B, with the proviso that said joint contains at least two gradations.

12. The method of claim 11, wherein said first and second transitioning steps utilize solid-state diffusion bonding.

13. The method of claim 11, wherein first metal material B is more than one metal material.

14. The method of claim 11, wherein said first and second transitioning is performed by at least one process selected from the group consisting of conventional powder processing and firing, bulk particulate processing, pre-form processing, layer processing, melt infiltration techniques, extrusion and thermal spraying, diffusion bonding, thermal spraying, thermal extrusion, and diffusion bond brazing.

15. The method of claim 11, wherein said first and second transitioning further comprises an additional metal material.

16. The method of claim 11, wherein the second transitioning between the second material C and the first metal material B further comprises an additional metal material.

17. The method of claim 16, wherein the additional metal material is at least one selected from the group consisting of titanium- cobalt-, and palladium-based materials and alloys.

* * * * *